US012676778B2

(12) United States Patent (10) Patent No.: US 12,676,778 B2
Kuriyama et al. (45) Date of Patent: Jul. 7, 2026

(54) WIRELESS COMMUNICATION METHOD, WIRELESS COMMUNICATION SYSTEM, AND TRANSMISSION DEVICE

(71) Applicant: NTT, Inc., Tokyo (JP)

(72) Inventors: Keita Kuriyama, Musashino (JP);
Hayato Fukuzono, Musashino (JP);
Toshifumi Miyagi, Musashino (JP);
Takeshi Onizawa, Musashino (JP)

(73) Assignee: NTT, Inc., Tokyo (JP)

( * ) Notice: Subject to any disclaimer, the term of this
patent is extended or adjusted under 35
U.S.C. 154(b) by 14 days.

(21) Appl. No.: 18/837,194

(22) PCT Filed: Feb. 16, 2022

(86) PCT No.: PCT/JP2022/006236
§ 371 (c)(1),
(2) Date: Aug. 9, 2024

(87) PCT Pub. No.: WO2023/157143
PCT Pub. Date: Aug. 24, 2023

(65) Prior Publication Data
US 2025/0141726 A1 May 1, 2025

(51) Int. Cl.
*H04L 27/26* (2006.01)
*H04L 5/00* (2006.01)
(52) U.S. Cl.
CPC ........ *H04L 27/2621* (2013.01); *H04L 5/0098*
(2013.01); *H04L 27/2615* (2013.01)
(58) Field of Classification Search
CPC . H04L 27/26; H04L 27/2601; H04L 27/2614;
H04L 27/2621; H04L 27/2626;
(Continued)

(56) References Cited

U.S. PATENT DOCUMENTS 7,519,123 B1 * 4/2009 Larsson ............. H04B 1/71635
370/257
7,746,766 B2 * 6/2010 Kowalski ........... H04L 27/2614
370/252
(Continued)

FOREIGN PATENT DOCUMENTS

JP 2007-201951 A 8/2007
JP 2009-194732 A 8/2009

OTHER PUBLICATIONS

P. Raghava Lasya et al., PAPR and out-of-band power reduction in
OFD M-based cognitive radios [online], 2015 International Con-
ference on Signal Processing and Communication Engineering
Systems, Jan. 2015, pp. 473-476 (4 pages).
(Continued)

*Primary Examiner* — James M Perez
(74) *Attorney, Agent, or Firm* — XSENSUS LLP

(57) ABSTRACT

A wireless communication method includes phase shift
amount determination processing for determining a random
phase shift amount for each of subcarriers of transmission
data. The wireless communication method further includes
modulation processing for modulating the transmission data
and further shifting a phase according to the random phase
shift amount for each of the subcarriers. The wireless
communication method further includes precoding process-
ing for performing precoding on the transmission data after
the modulation processing, and transmission processing for
transmitting the transmission data after the precoding pro-
cessing from the transmission device to the reception device.

7 Claims, 14 Drawing Sheets

(58) Field of Classification Search
CPC ............. H04L 27/2627; H04L 27/2634; H04L 27/26362; H04L 27/2615; H04L 5/0091; H04L 5/0096; H04L 5/0098
See application file for complete search history.

(56) References Cited

U.S. PATENT DOCUMENTS

| | | | | | |
|---|---|---|---|---|---|
| 8,073,079 | B1 * | 12/2011 | Ahmed | ............... | H04L 27/2275 |
| | | | | | 375/322 |
| 8,254,476 | B2 * | 8/2012 | Ohwatari | ........... | H04L 27/2621 |
| | | | | | 375/260 |
| 8,761,303 | B2 * | 6/2014 | Griot | ................... | H04L 27/2607 |
| | | | | | 375/135 |
| 8,995,568 | B1 * | 3/2015 | Wu | ........................ | H04K 1/006 |
| | | | | | 375/295 |
| 9,240,831 | B2 * | 1/2016 | Kakishima | ........... | H04B 7/0691 |
| 9,769,777 | B2 * | 9/2017 | Inoue | ..................... | H01Q 3/267 |
| 9,960,942 | B2 * | 5/2018 | Huan | .................... | H04L 27/263 |
| 10,171,173 | B2 * | 1/2019 | Okamoto | ............. | H04B 10/508 |
| 2003/0202460 | A1 * | 10/2003 | Jung | ................... | H04L 27/2621 |
| | | | | | 370/480 |
| 2006/0045193 | A1 * | 3/2006 | Stolpman | ............ | H04L 25/0226 |
| | | | | | 375/260 |
| 2006/0227890 | A1 * | 10/2006 | Koga | ....................... | H04B 3/54 |
| | | | | | 375/260 |
| 2007/0217329 | A1 * | 9/2007 | Abedi | ................... | H04L 5/0044 |
| | | | | | 370/480 |
| 2007/0248196 | A1 * | 10/2007 | Nakao | ............... | H04L 25/03159 |
| | | | | | 375/344 |
| 2008/0075188 | A1 * | 3/2008 | Kowalski | ........... | H04L 27/2602 |
| | | | | | 375/267 |
| 2009/0052577 | A1 * | 2/2009 | Wang | .................... | H04L 1/0643 |
| | | | | | 375/299 |
| 2009/0207931 | A1 * | 8/2009 | Ohwatari | ........... | H04L 27/2621 |
| | | | | | 375/267 |
| 2010/0239046 | A1 * | 9/2010 | Chun | ................... | H04L 27/2614 |
| | | | | | 375/295 |
| 2014/0105121 | A1 * | 4/2014 | Jose | ...................... | H04L 5/0023 |
| | | | | | 370/329 |
| 2014/0362946 | A1 * | 12/2014 | Kakishima | ........... | H04B 7/0469 |
| | | | | | 375/295 |
| 2015/0271003 | A1 * | 9/2015 | Kuchi | ................... | H04L 1/0656 |
| | | | | | 370/329 |
| 2016/0183209 | A1 * | 6/2016 | Inoue | ..................... | H04B 17/12 |
| | | | | | 375/362 |
| 2017/0070296 | A1 * | 3/2017 | Okamoto | ........... | H04B 10/2513 |
| 2017/0126454 | A1 * | 5/2017 | Huan | .................... | H04L 27/263 |
| 2017/0230224 | A1 * | 8/2017 | Murakami | .......... | H04B 7/0682 |
| 2025/0112808 | A1 * | 4/2025 | Kuriyama | ............ | H04B 7/0456 |
| 2025/0141726 | A1 * | 5/2025 | Kuriyama | .......... | H04L 27/2621 |
| 2025/0158857 | A1 * | 5/2025 | Kuriyama | ........... | H04B 7/0456 |

OTHER PUBLICATIONS

Adriana Lipovac, et al., "BER Based Ofdm Papr Estimation", 2018 26th International Conference on Software, Telecommunications and Computer Networks (SoftCOM), Sep. 2018, 6 pages.
Kuriyama et al., "PAPR Reduction on Wideband Single-Carrier MIMO Systems with Variable Tap-Length FIR Beamforming," Society Conference of the Institute of Electronics, Information and Communication Engineers, B-5-70, Sep. 14, 2021, 2 pages including English Translation.
Alharbi et al., "A combined SLM and closed-loop QO-STBC for PAPR mitigation in MIMO-OFDM transmission" 2008 16th European Signal Processing Conference, Aug. 25-29, 2008, 6 pages.
Satoshi Suyama et al: "Subcarrier Phase 1-8 INV. Hopping MIMO-OFDM Transmission Employing H04L27/26 Enhanced Selected Mapping for PAPR H04B7/0456 Reduction", Personal, Indoor and Mobile Radio Communications, 2006 IEEE 17th International Symposium on, IEEE, PI, Sep. 1, 2006 (Sep. 1, 2006), pp. 1-5, XP031023789, ISBN: 978-1-4244-0329-5.

* cited by examiner

1: WIRELESS COMMUNICATION SYSTEM

PHASE SHIFT AMOUNT $\theta$ s

WIRELESS COMMUNICATION METHOD, WIRELESS COMMUNICATION SYSTEM, AND TRANSMISSION DEVICE

CROSS-REFERENCE TO RELATED APPLICATION

The present application is based on PCT filing PCT/JP2022/006236, filed Feb. 16, 2022, the entire contents of which are incorporated herein by reference.

TECHNICAL FIELD

The present invention relates to a wireless communication technology. In particular, the present invention relates to a wireless communication technology for performing precoding on transmission data on a transmitting side.

BACKGROUND ART

In wireless communication, a transmitting side may perform precoding on transmission data. For example, when wideband transmission is performed in a frequency-selective fading environment, channel equalization is performed by precoding. As another example, in a multiple-input multiple-output (MIMO) system, stream separation is performed by precoding.

When precoding is performed on the transmitting side, a peak to average power ratio (PAPR) increases due to signal superposition. A transmission signal is amplified by a power amplifier before being transmitted from an antenna, but when a signal with a high PAPR is input to the power amplifier, the signal is affected by a nonlinear characteristic of the power amplifier, and nonlinear distortion may occur. When the nonlinear distortion of the transmission signal occurs, there is a concern that communication with many errors will be performed.

Non Patent Literature 1 discloses a technique for reducing a PAPR in a wideband single-carrier MIMO system.

CITATION LIST

Non Patent Literature

Non Patent Literature 1: Kuriyama et al., "PAPR Reduction on Wideband Single-Carrier MIMO Systems with Variable Tap-Length FIR Beamforming," Society Conference of the Institute of Electronics, Information and Communication Engineers, B-5-70, September 2021.

SUMMARY OF INVENTION

Technical Problem

As described above, when the transmitting side performs precoding on transmission data in wireless communication, the PAPR increases.

One object of the present invention is to provide a technique capable of reducing a PAPR when a transmitting side performs precoding on transmission data in wireless communication.

Solution to Problem

A first aspect relates to a wireless communication method for performing wireless communication between a transmission device and a reception device.

The wireless communication method includes:

phase shift amount determination processing that determines a random phase shift amount for each of subcarriers of transmission data;

modulation processing that modulates the transmission data and further shifts a phase according to the random phase shift amount for each of the subcarriers;

precoding processing that performs precoding on the transmission data after the modulation processing; and transmission processing that transmits the transmission data after the precoding processing from the transmission device to the reception device.

A second aspect relates to a wireless communication system.

The wireless communication system includes a transmission device and a reception device.

The transmission device is configured to execute:

phase shift amount determination processing that determines a random phase shift amount for each of subcarriers of transmission data;

modulation processing that modulates the transmission data and further shifts a phase according to the random phase shift amount for each of the subcarriers;

precoding processing that performs precoding on the transmission data after the modulation processing; and transmission processing that transmits the transmission data after the precoding processing from the transmission device to the reception device.

A third aspect relates to a transmission device that performs wireless communication with a reception device.

The transmission device includes:

a phase shift amount determination unit configured to determine a random phase shift amount for each of subcarriers of transmission data;

a modulation unit configured to modulate the transmission data and to further shift a phase according to the random phase shift amount for each of the subcarriers;

a precoding unit configured to perform precoding on the transmission data after the modulation processing; and a transmission unit configured to transmit the transmission data after the precoding processing to the reception device.

Advantageous Effects of Invention

According to the present invention, it is possible to reduce a PAPR when a transmitting side performs precoding on transmission data in wireless communication.

DESCRIPTION OF EMBODIMENTS

Embodiments of the present invention will be described with reference to the accompanying drawings.

1. OUTLINE OF WIRELESS COMMUNICATION SYSTEM

Figure 1:
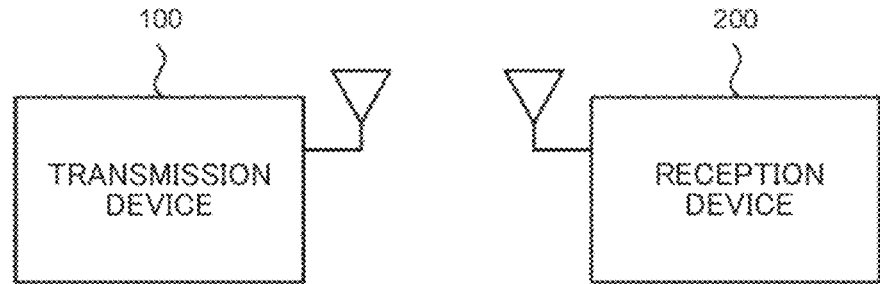
FIG. 1 is a conceptual diagram schematically illustrating a configuration of a wireless communication system according to an embodiment.

FIG. 1 is a conceptual diagram schematically illustrating a configuration of a wireless communication system 1 according to the present embodiment. The wireless communication system 1 includes a transmission device 100 and a reception device 200. The transmission device 100 and the reception device 200 perform wireless communication. The wireless communication system 1 may be a multiple-input multiple-output (MIMO) system, a single-input single-output (SISO) system, or another system. The wireless communication system 1 may perform single-carrier transmission or may perform multi-carrier transmission based on orthogonal frequency division multiplexing (OFDM) or the like.

The transmission device 100 performs precoding on the transmission data before transmitting the transmission data to the reception device 200. Precoding is a well-known technique. For example, when wideband transmission is performed in a frequency-selective fading environment, channel equalization is performed by precoding. As another example, in a MIMO system, stream separation is performed by precoding.

Figure 2:
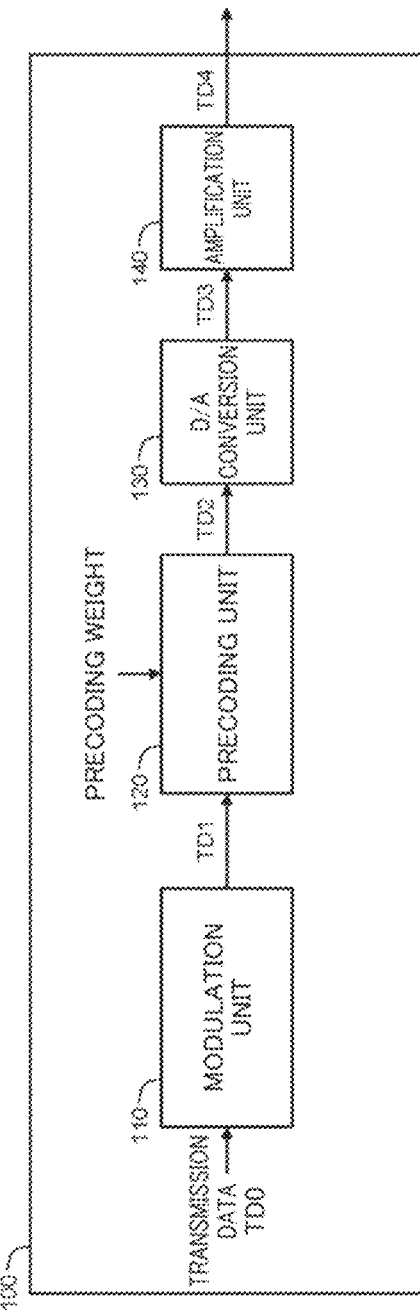
FIG. 2 is a block diagram illustrating a basic configuration example of a transmission device that performs precoding.

FIG. 2 is a block diagram illustrating a basic configuration example of the transmission device 100 that performs precoding. The transmission device 100 includes a modulation unit 110, a precoding unit 120, a D/A conversion unit 130, and an amplification unit 140.

The modulation unit 110 receives transmission data (a transmission signal) TD0 transmitted from the transmission device 100 to the reception device 200. The modulation unit 110 performs "modulation processing" for modulating the transmission data TD0 using a predetermined modulation scheme. Examples of the predetermined modulation scheme include quadrature amplitude modulation (QAM), quadrature phase shift keying (QPSK), and the like. The modulation unit 110 outputs transmission data TD1 after the modulation processing.

The precoding unit 120 receives the transmission data TD1 after the modulation processing. The precoding unit 120 performs "precoding processing" for performing precoding on the transmission data TD1. Various examples are known as precoding weights (precoding matrices) used in precoding processing. In the present embodiment, the precoding weights are not particularly limited. The precoding unit 120 outputs transmission data TD2 after the precoding processing.

The D/A conversion unit 130 receives the transmission data TD2 after the precoding processing. The D/A conversion unit 130 performs D/A conversion on the transmission data TD2 and outputs transmission data TD3.

The amplification unit 140 receives the transmission data TD3 after the D/A conversion. The amplification unit 140 includes a power amplifier, and performs "amplification processing" for amplifying the transmission data TD3.

Furthermore, the amplification unit 140 performs "transmission processing" for transmitting transmission data (a transmission signal) TD4 after the amplification processing to the reception device 200 via an antenna. The amplification unit 140 also functions as a "transmission unit" that performs transmission processing.

Figure 3:
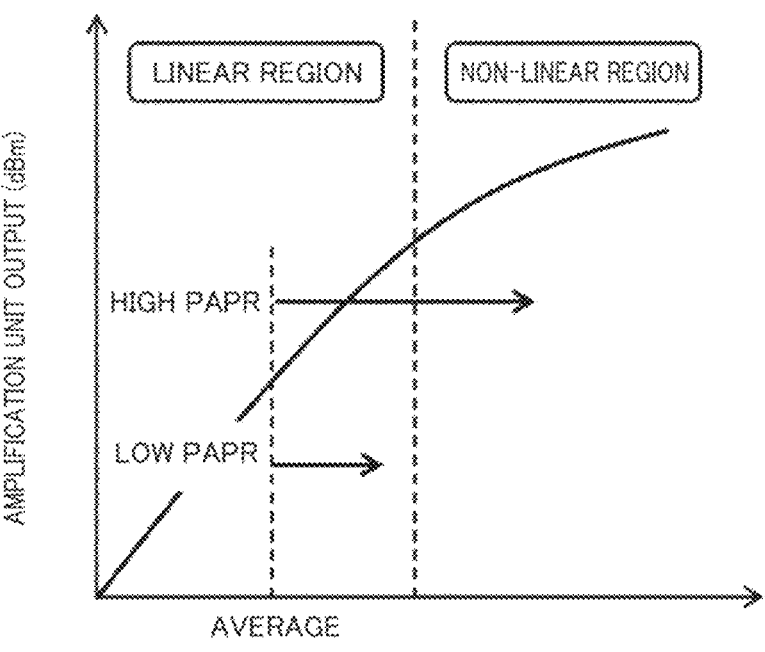
FIG. 3 is a conceptual diagram for describing amplification characteristics of an amplification unit.

FIG. 3 is a conceptual diagram for describing amplification characteristics of the amplification unit 140. The horizontal axis represents input signal power, and the vertical axis represents output signal power. As illustrated in FIG. 3, the amplification characteristics include not only a linear region but also a nonlinear region, and the influence of the nonlinear characteristics increases as the input signal power increases. Even if the average power is included in the linear region, an input signal with a high peak to average power ratio (PAPR) is affected by the nonlinear characteristics. As a result, distortion of a constellation of transmission data may occur.

Figure 4:
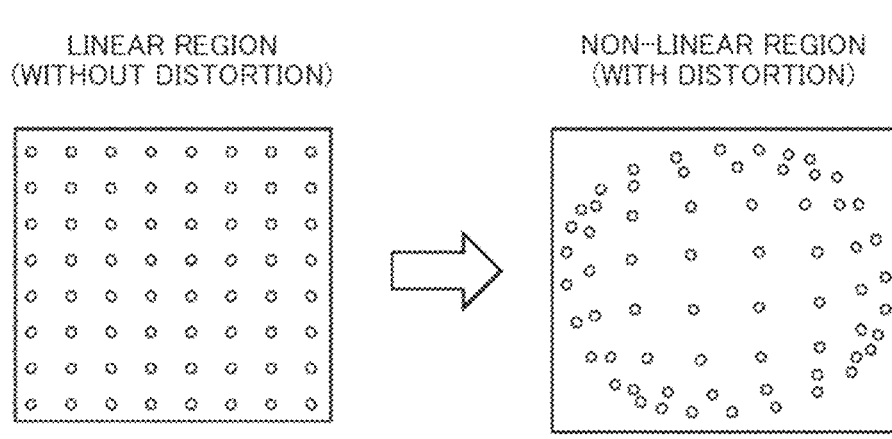
FIG. 4 is a conceptual diagram for describing distortion of a constellation.

FIG. 4 is a conceptual diagram for describing distortion of a constellation of transmission data. Here, as an example, a constellation of transmission data in the case of 64 QAM is illustrated. There is no distortion in the constellation in the linear region. However, distortion occurs in the constellation in the nonlinear region.

As described above, in the present embodiment, the transmission device 100 (precoding unit 120) performs precoding on transmission data. Precoding with signal superposition tends to increase a PAPR. Therefore, transmission data (a transmission signal) with a high PAPR is input to the amplification unit 140, and there is a concern of nonlinear distortion occurring due to the influence of nonlinear characteristics. When the nonlinear distortion of the transmission data occurs, there is a concern that communication with many errors will be performed.

Therefore, the present embodiment provides a technique capable of reducing a PAPR when the transmission device 100 performs precoding on transmission data. The present embodiment introduces a "phase shift" described below to reduce a PAPR.

2. PAPR REDUCTION USING PHASE SHIFT

Figure 5:
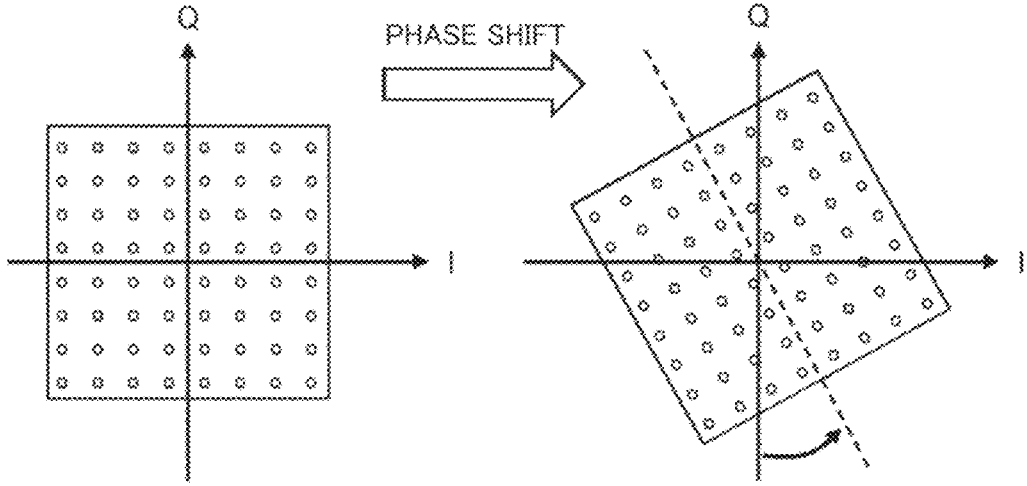
FIG. 5 is a conceptual diagram for describing a basis of a phase shift according to the embodiment.

FIG. 5 is a conceptual diagram for describing a basis of a phase shift according to the present embodiment. Here, as an example, a case where the modulation scheme is 64 QAM is illustrated. However, the modulation scheme is not limited to 64 QAM.

The transmission device 100 (modulation unit 110) performs modulation processing for modulating transmission data using a predetermined modulation scheme. In this modulation processing, the transmission device 100 not only modulates the transmission data using a predetermined modulation scheme, but also applies a phase shift to the transmission data. The phase shift amount is θs. That is, in the modulation processing, the transmission device 100 modulates the transmission data using a predetermined modulation scheme, and further shifts the phase of the transmission data according to the phase shift amount θs.

Figure 6:
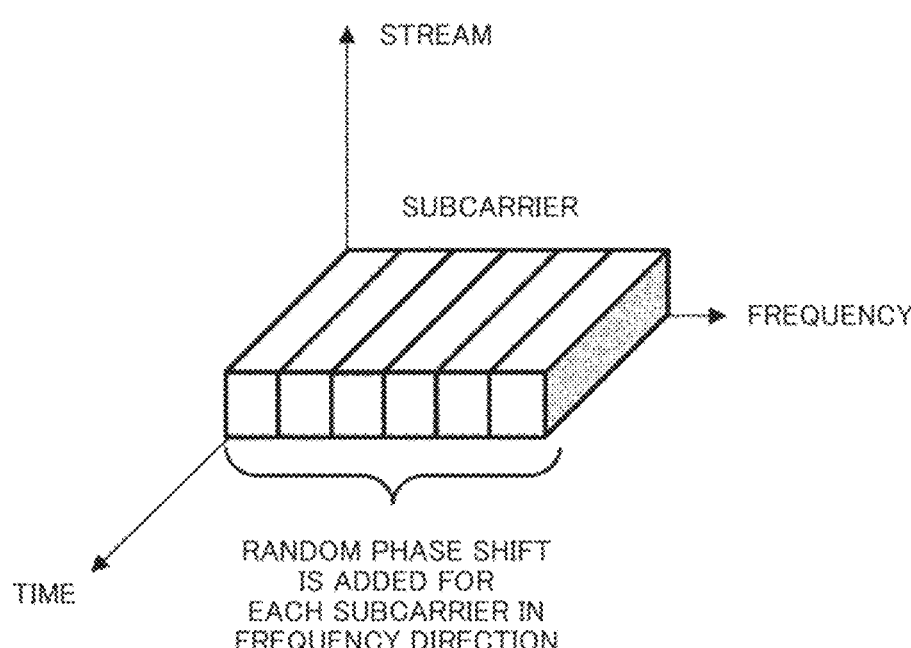
FIG. 6 is a conceptual diagram for describing an outline of the phase shift according to the embodiment.

FIG. 6 is a conceptual diagram for describing an outline of the phase shift according to the present embodiment. According to the present embodiment, the phase shift amount θs is determined for each subcarrier of the transmission data, and the phase shift is performed. That is, the phase shift amount θs is separately determined in units of subcarriers in the frequency direction, and the phase shift is performed according to the phase shift amount θs for each subcarrier.

In addition, according to the present embodiment, the phase shift amount θs for each subcarrier is random. That is, the transmission device 100 determines a random phase shift amount θs for each subcarrier of transmission data.

The random sequence of the phase shift amount θs is hereinafter referred to as a "random phase shift sequence Θ." The random phase shift sequence Θ is generated, for example, by the transmission device 100 itself. Alternatively, a random phase shift sequence Θ generated by another device may be provided to the transmission device 100. Information indicating the random phase shift sequence Θ is hereinafter referred to as a "phase shift pattern PAT." The transmission device 100 acquires a phase shift pattern PAT. Further, the transmission device 100 determines a random phase shift amount θs for each subcarrier on the basis of the random phase shift sequence Θ indicated by the phase shift pattern PAT. Thereafter, the transmission device 100 performs modulation processing according to the determined random phase shift amount θs, and further performs subsequent processing.

Figure 7:
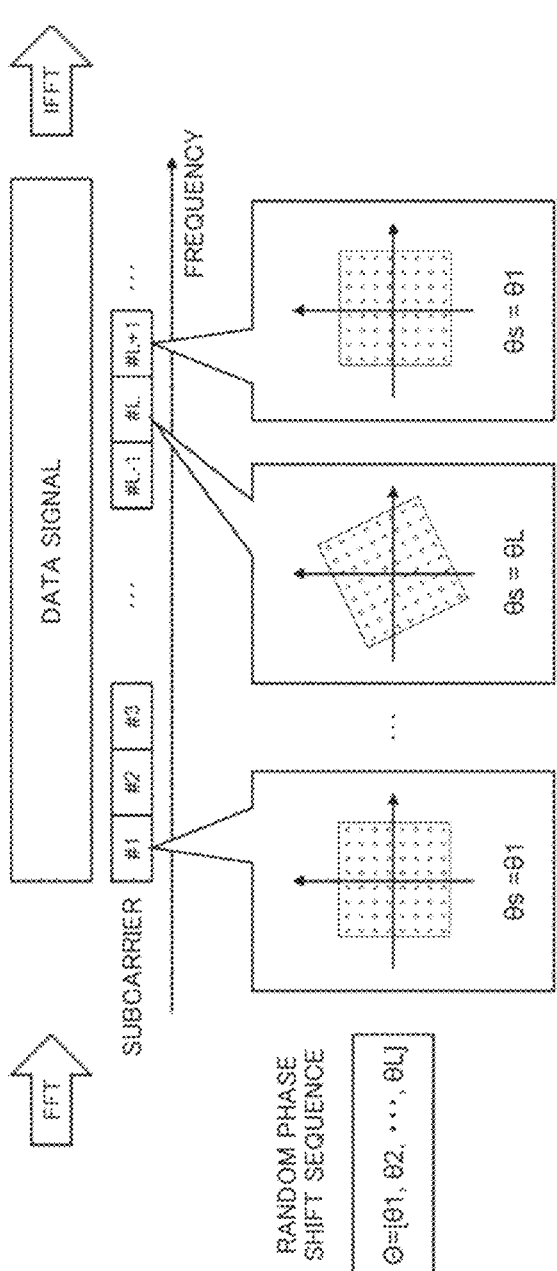
FIG. 7 is a conceptual diagram for describing an example of a random phase shift sequence according to the embodiment.

FIG. 7 is a conceptual diagram for describing an example of a random phase shift sequence Θ according to the present embodiment. In the example illustrated in FIG. 7, a random phase shift sequence Θ having a signal length L is used. The random phase shift sequence Θ includes L random phase shift amounts θ1 to θL. L is an integer of 2 or more and is determined in advance. The transmission device 100 repeatedly applies the random phase shift sequence Θ (=θ1 to θL) every L subcarriers to determine the random phase shift amount θs for each subcarrier.

As a modification example, a plurality of types of phase shift patterns PAT may be used. The plurality of types of phase shift patterns PAT each indicate a different random phase shift sequence Θ. In this case, the transmission device 100 selects one from among a plurality of types of phase shift patterns PAT. For example, the transmission device 100 performs modulation processing using each of a plurality of types of phase shift patterns PAT, and further performs subsequent processing. Then, the transmission device 100 calculates a PAPR of the transmission data after the precoding processing by the precoding unit 120, and selects one that minimizes a PAPR from among the plurality of types of phase shift patterns PAT. As another example, the transmission device 100 may acquire information on reception quality (ex: a bit error rate (BER)) from the reception device 200 and select one that maximizes a reception quality from among the plurality of types of phase shift patterns PAT. Further, the transmission device 100 determines a random phase shift amount θs for each subcarrier on the basis of the random phase shift sequence Θ indicated by the selected one phase shift pattern PAT. Thereafter, the transmission device 100 performs modulation processing according to the determined random phase shift amount θs, and further performs subsequent processing.

The range that the random phase shift amount θs can take can be freely set. After the random phase shift amount θs is generated, rounding to an integer may be performed.

Figure 8:
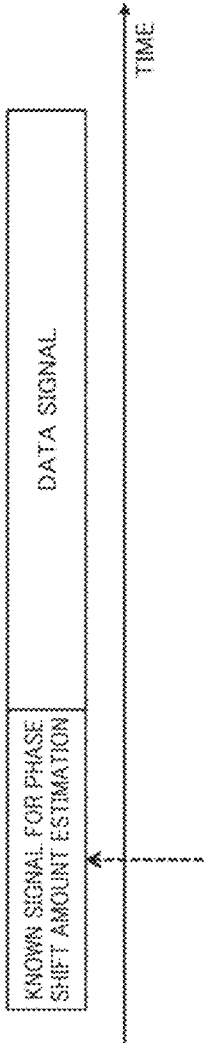
FIG. 8 is a conceptual diagram for describing signal addition processing according to the embodiment.

FIG. 8 is a conceptual diagram for describing "signal addition processing" according to the present embodiment. The reception device 200 needs to estimate the random phase shift amount θs (that is, the phase shift pattern PAT, the random phase shift sequence Θ) applied to the transmission data in the transmission device 100. Therefore, the transmission device 100 adds a known signal to be used in the reception device 200 for its estimation to the transmission data. More specifically, the transmission device 100 adds a known signal to the head or end of a predetermined data unit (ex: frame, slot). In the case of the example illustrated in FIG. 7, a known signal having a signal length L is added. The phase shift is also performed on the added known signal according to the random phase shift sequence Θ.

The reception device 200 receives the transmission data transmitted from the transmission device 100 as reception data. The reception device 200 estimates the random phase shift amount θs (that is, the phase shift pattern PAT, the random phase shift sequence Θ) applied in the transmission device 100 on the basis of the known signal added to the reception data. Specifically, the reception device 200 compares the known signal added to the reception data with a known signal held by the reception device 200 to estimate the random phase shift amount θs. Then, the reception device 200 demodulates the reception data in consideration of the estimated phase shift amount θs. That is, when demodulating the reception data, the reception device 200 returns the phase by the phase shift amount θs for each subcarrier of the reception data.

Figure 9:
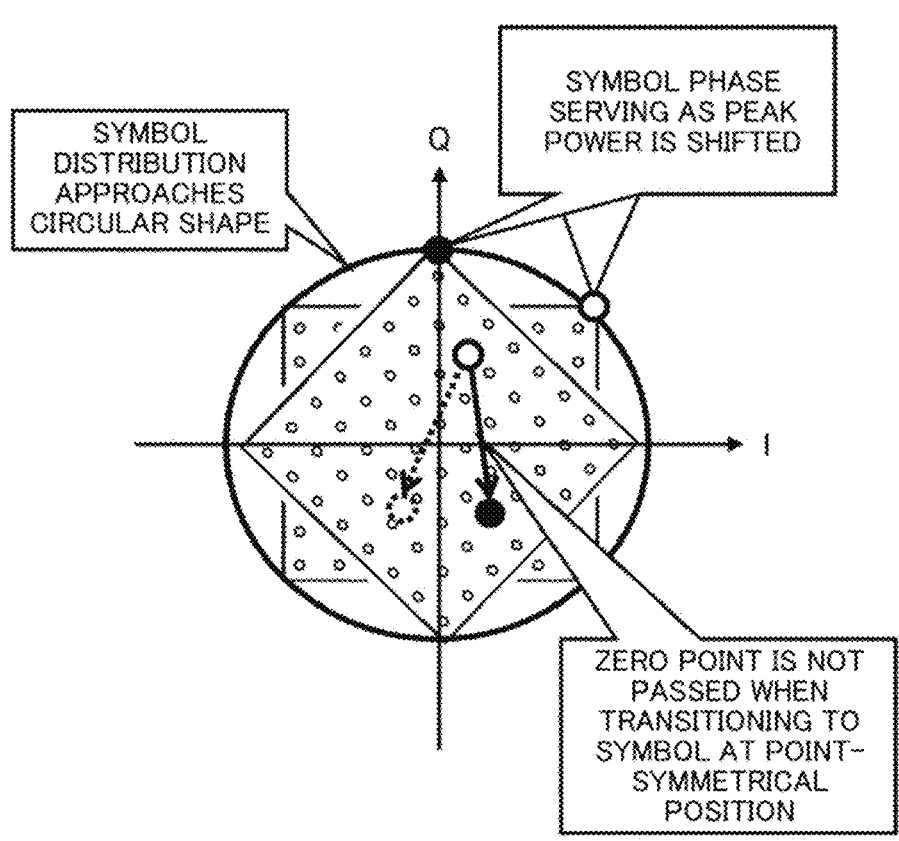
FIG. 9 is a conceptual diagram for describing an effect of the phase shift according to the embodiment.

FIG. 9 is a conceptual diagram for describing an effect of the phase shift according to the present embodiment. As illustrated in FIG. 9, the distribution (symbol distribution) of the symbol sequence in the constellation becomes closer to a circular shape due to the phase shift. Since the symbol phase causing the peak power is shifted, the peak power decreases at the time of signal superposition by precoding. Furthermore, since the zero point is not passed when transitioning to a symbol at a point-symmetrical position, the average power increases as compared with the case where no phase shift is performed. In this way, the PAPR can be reduced by performing the phase shift during the modulation processing of the transmission data.

Figure 10:
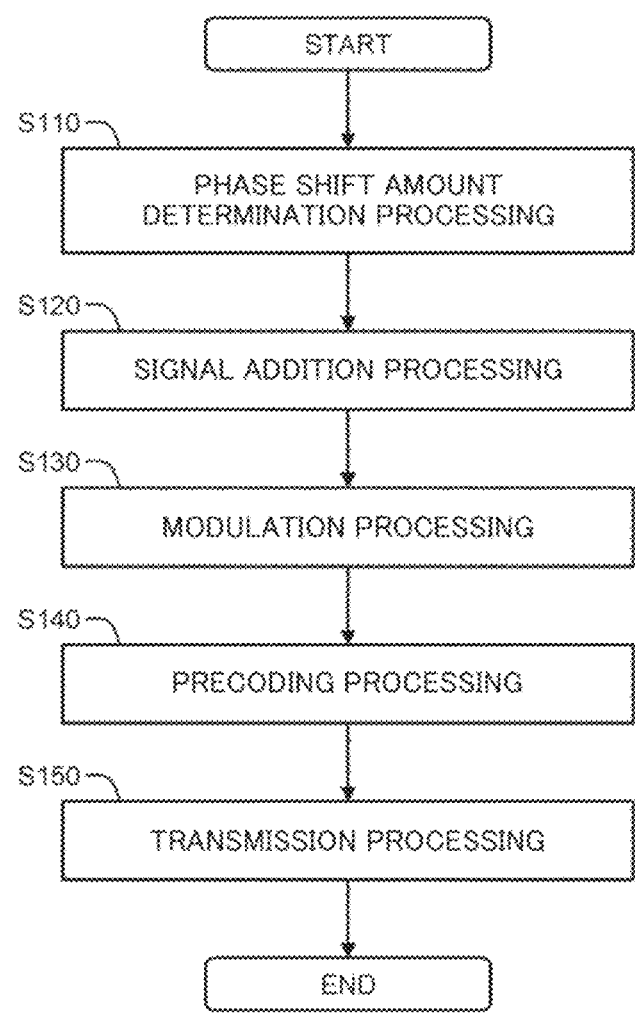
FIG. 10 is a flowchart schematically illustrating processing by the transmission device according to the embodiment.

FIG. 10 is a flowchart schematically illustrating processing by the transmission device 100 according to the present embodiment.

In Step S110, the transmission device 100 performs "phase shift amount determination processing." That is, the transmission device 100 determines a random phase shift amount θs for each subcarrier of the transmission data. More specifically, the transmission device 100 acquires a phase shift pattern PAT indicating a random phase shift sequence Θ. Further, the transmission device 100 determines a random phase shift amount θs for each subcarrier on the basis of the random phase shift sequence Θ indicated by the phase shift pattern PAT.

In Step S120, the transmission device 100 performs "signal addition processing" on the transmission data. More specifically, the transmission device 100 adds a known signal used in the reception device 200 to estimate the random phase shift amount θs to the transmission data.

In Step S130, the transmission device 100 performs "modulation processing" on the transmission data. More specifically, the transmission device 100 modulates the transmission data using a predetermined modulation scheme, and further shifts the phase according to the random phase shift amount θs for each subcarrier. At this time, the phase shift is also performed on the known signal added to the transmission data.

In Step S140, the transmission device 100 performs "precoding processing" on the transmission data. More specifically, the transmission device 100 performs precoding on the transmission data after the modulation processing.

In Step S150, the transmission device 100 performs "transmission processing" for transmitting the transmission data after the precoding processing from the transmission device to the reception device.

Note that, during communication, the transmission device 100 may appropriately update the phase shift pattern PAT. At the time of update, the transmission device 100 may review all types of phase shift patterns PAT again and select one from among the all types of phase shift patterns PAT. Alternatively, the transmission device 100 may review only a certain number of phase shift patterns PAT that were relatively excellent last time, and select one from among the certain number of phase shift patterns PAT.

As described above, according to the present embodiment, it is possible to reduce the PAPR when precoding is performed by applying the phase shift to the transmission data.

3. CONFIGURATION EXAMPLES

Configuration examples of the transmission device 100 and the reception device 200 will be described below.
3-1. Configuration Example of Transmission Device

3-1-1. First Configuration Example

Figure 11:
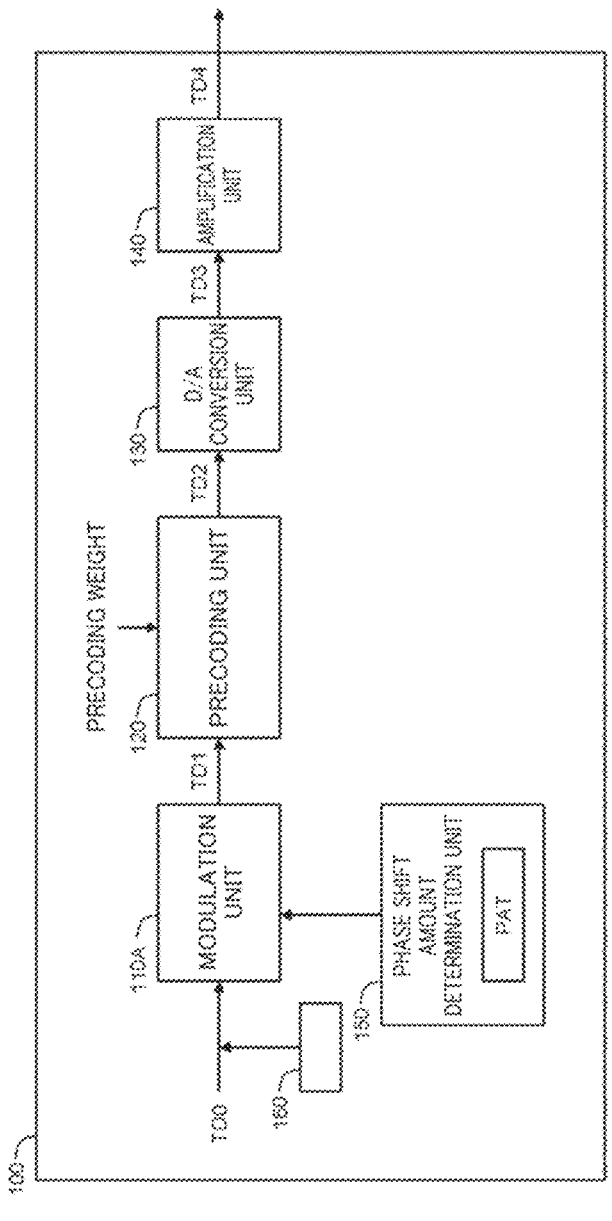
FIG. 11 is a block diagram illustrating a first configuration example of the transmission device according to the embodiment.

FIG. 11 is a block diagram illustrating a first configuration example of the transmission device 100. The transmission device 100 includes a modulation unit 110A, a precoding unit 120, a D/A conversion unit 130, an amplification unit 140, a phase shift amount determination unit 150, and a signal addition unit 160. The modulation unit 110A has a phase shift function in addition to the function of the modulation unit 110 illustrated in FIG. 2. The precoding unit 120, the D/A conversion unit 130, and the amplification unit 140 are similar to those illustrated in FIG. 2. The phase shift amount determination unit 150 performs "phase shift amount determination processing." That is, the phase shift amount determination unit 150 determines the random phase shift amount θs for each subcarrier of transmission data TD0.

More specifically, the phase shift amount determination unit 150 acquires a phase shift pattern PAT indicating a random phase shift sequence Θ. Further, the phase shift amount determination unit 150 determines a random phase shift amount θs for each subcarrier on the basis of the random phase shift sequence Θ indicated by the phase shift pattern PAT (see FIG. 7). Further, the phase shift amount determination unit 150 notifies the modulation unit 110A of the random phase shift amount θs for each subcarrier.

The signal addition unit 160 performs "signal addition processing." More specifically, the signal addition unit 160 adds a known signal used in the reception device 200 to estimate the random phase shift amount θs to the transmission data (see FIG. 8). For example, the signal addition unit 160 adds a known signal to the head or end of a predetermined data unit.

The modulation unit 110A receives information on the random phase shift amount θs for each subcarrier from the phase shift amount determination unit 150. In the modulation processing, the modulation unit 110A modulates the transmission data TD0 using a predetermined modulation scheme, and further shifts the phase according to the random phase shift amount θs for each subcarrier (see FIG. 7). At this time, the modulation unit 110A performs phase shift also to the added known signal. Further, the modulation unit 110A outputs the transmission data TD1 after the modulation processing.

3-1-2. Second Configuration Example

Figure 12:
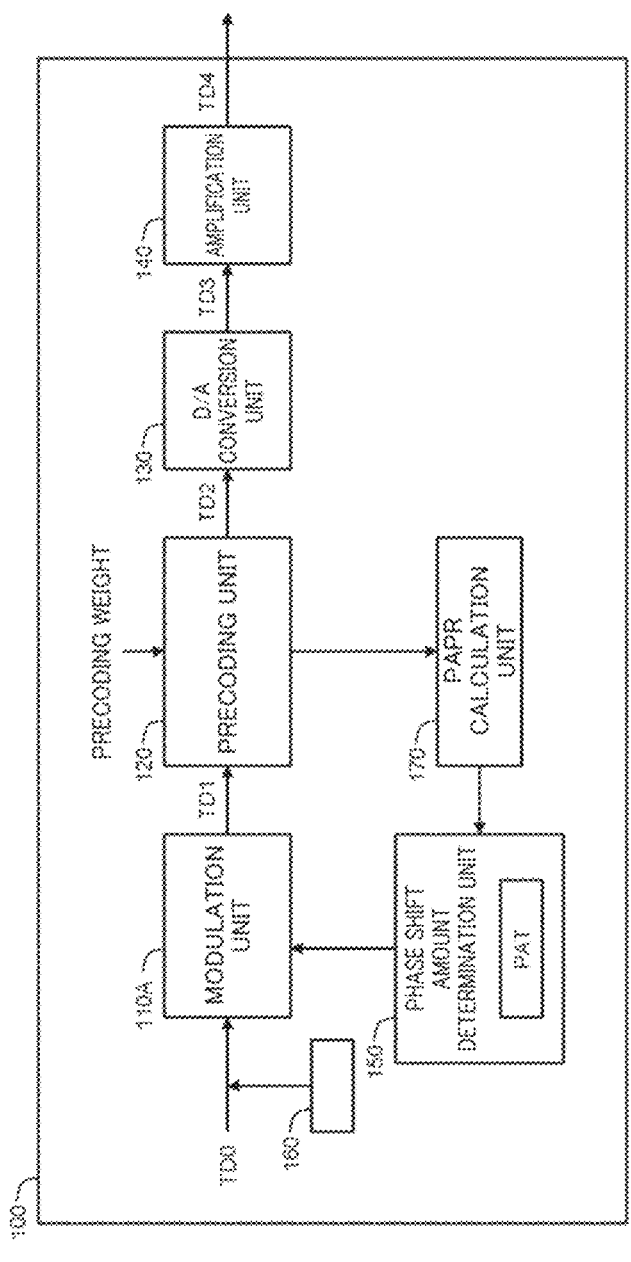
FIG. 12 is a block diagram illustrating a second configuration example of the transmission device according to the embodiment.

FIG. 12 is a block diagram illustrating a second configuration example of the transmission device 100. The descriptions overlapping with those of the first configuration example illustrated in FIG. 11 will be appropriately omitted. The transmission device 100 further includes a PAPR calculation unit 170 in addition to the first configuration example illustrated in FIG. 11.

The phase shift amount determination unit 150 acquires a plurality of types of phase shift patterns PAT. The plurality of types of phase shift patterns PAT each indicate a different random phase shift sequence Θ. The phase shift amount determination unit 150 temporarily selects a plurality of types of phase shift patterns PAT one by one in order. The phase shift amount determination unit 150 determines a random phase shift amount θs for each subcarrier on the basis of the random phase shift sequence Θ indicated by the temporarily selected phase shift pattern PAT. Further, the phase shift amount determination unit 150 notifies the modulation unit 110A of the random phase shift amount θs for each subcarrier.

The modulation unit 110A performs modulation processing in the same manner as in the case of the first configuration example. The precoding unit 120 receives the transmission data TD1 after the modulation processing. The precoding unit 120 performs precoding on the transmission data TD1 and outputs transmission data TD2.

The PAPR calculation unit 170 receives the transmission data TD2 after the precoding processing. The PAPR calculation unit 170 calculates a PAPR of the transmission data TD2 in a predetermined data unit according to a predetermined calculation formula. The PAPR calculation unit 170 outputs information on the calculated PAPR to the phase shift amount determination unit 150.

The phase shift amount determination unit 150 acquires information on the PAPR for each of a plurality of types of phase shift patterns PAT. Then, the phase shift amount determination unit 150 selects one that minimizes a PAPR from among the plurality of types of phase shift patterns PAT. The phase shift amount determination unit 150 determines the random phase shift amount θs for each subcarrier according to the selected one phase shift pattern PAT. Further, the phase shift amount determination unit 150 notifies the modulation unit 110A of the determined random phase shift amount θs for each subcarrier. Thereafter, the modulation unit 110A performs modulation processing by using the random phase shift amount θs notified from the phase shift amount determination unit 150.

3-1-3. Third Configuration Example

Figure 13:
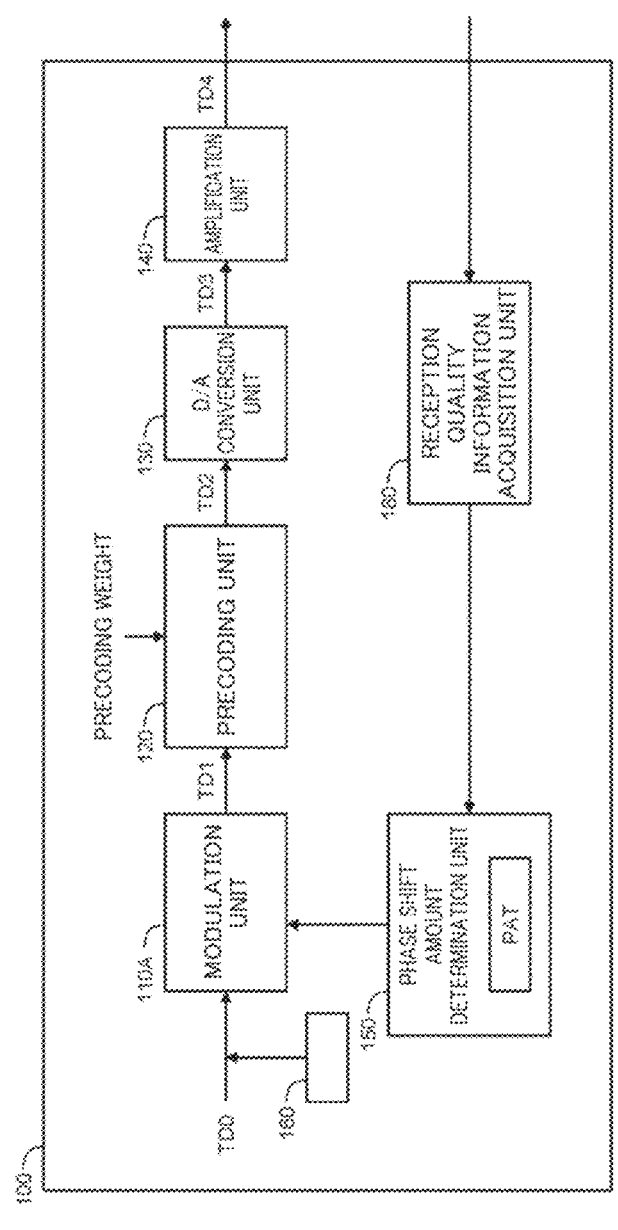
FIG. 13 is a block diagram illustrating a third configuration example of the transmission device according to the embodiment.

FIG. 13 is a block diagram illustrating a third configuration example of the transmission device 100. The descriptions overlapping with those of the second configuration example illustrated in FIG. 12 will be appropriately omitted.

In the third configuration example, the transmission device 100 includes a reception quality information acquisition unit 180 instead of the PAPR calculation unit 170. The reception quality information acquisition unit 180 acquires information on the reception quality (ex: BER) of the transmission data from the reception device 200. The reception quality information acquisition unit 180 outputs the information on the reception quality to the phase shift amount determination unit 150.

The phase shift amount determination unit 150 acquires information on the reception quality for each of a plurality of types of phase shift patterns PAT. Then, the phase shift amount determination unit 150 selects one that maximizes a reception quality from among the plurality of types of phase shift patterns PAT. The phase shift amount determination unit 150 determines the random phase shift amount θs for each subcarrier according to the selected one phase shift pattern PAT. Further, the phase shift amount determination unit 150 notifies the modulation unit 110A of the determined random phase shift amount θs for each subcarrier. Thereafter, the modulation unit 110A performs modulation processing by using the random phase shift amount θs notified from the phase shift amount determination unit 150.

3-1-4. Hardware Configuration Example

The transmission device 100 includes one or more processors (hereinafter simply referred to as a "processor") and one or more storage devices (hereinafter simply referred to as a "storage device"). For example, the processor includes a central processing unit (CPU). The storage device stores various types of information necessary for processing by the processor. Examples of the storage device include a volatile memory, a non-volatile memory, a hard disk drive (HDD), a solid state drive (SSD), and the like.

The processor may execute a control program, which is a computer program. The control program is stored in the storage device. The control program may be recorded in a computer-readable recording medium. The function of the processor is implemented by the processor executing the control program.

Information on a plurality of types of phase shift patterns PAT prepared in advance is stored in the storage device. Functions of the modulation unit 110A, the precoding unit 120, the phase shift amount determination unit 150, the signal addition unit 160, the PAPR calculation unit 170, the reception quality information acquisition unit 180, and the like are implemented through cooperation between the processor and the storage device.

3-2. Configuration Example of Reception Device

Figure 14:
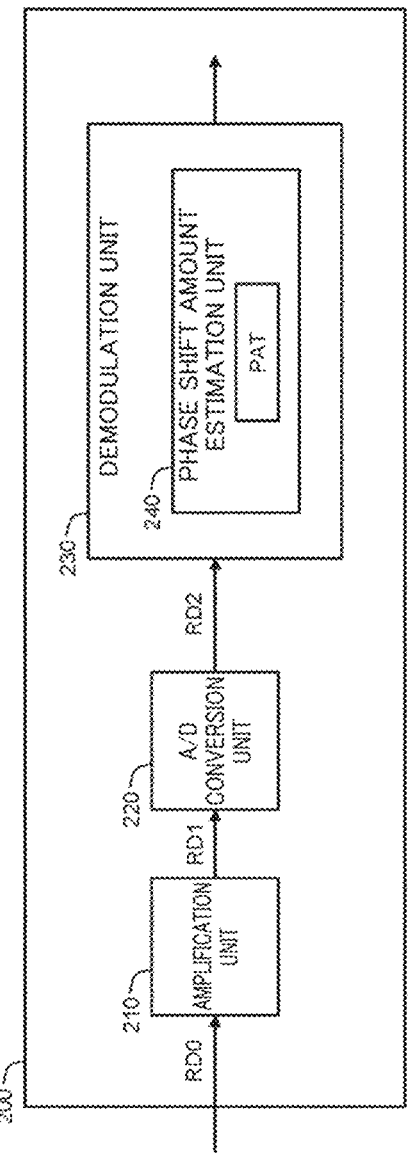
FIG. 14 is a block diagram illustrating a configuration example of a reception device according to the embodiment.

FIG. 14 is a block diagram illustrating a configuration example of the reception device 200. The reception device 200 includes an amplification unit 210, an A/D conversion unit 220, and a demodulation unit 230.

The reception device 200 receives the transmission data transmitted from the transmission device 100 as reception data (reception signal) RD0. The amplification unit 210 amplifies the reception data RD0 and outputs reception data RD1. The A/D conversion unit 220 performs A/D conversion on the reception data RD1 and outputs reception data RD2.

The demodulation unit 230 performs "demodulation processing" for demodulating the reception data RD2. At this time, the demodulation unit 230 demodulates the reception data RD2 in consideration of the phase shift amount θs.

More specifically, the demodulation unit 230 includes a phase shift amount estimation unit 240. The phase shift amount estimation unit 240 estimates the random phase shift amount θs (that is, the phase shift pattern PAT, the random phase shift sequence Θ) applied in the transmission device 100 on the basis of the known signal added to the reception data RD2. Specifically, the phase shift amount estimation unit 240 compares the known signal added to the reception data RD2 with a known signal held by the phase shift amount estimation unit 240 to estimate the random phase shift amount θs. Then, the demodulation unit 230 demodulates the reception data RD2 in consideration of the estimated phase shift amount θs. That is, the demodulation unit 230 demodulates the reception data RD2 using a predetermined demodulation scheme, and returns the phase by the phase shift amount θs for each subcarrier.

The reception device 200 includes one or more processors (hereinafter simply referred to as a "processor") and one or more storage devices (hereinafter simply referred to as a "storage device"). The processor may execute a control program, which is a computer program. The control program is stored in the storage device. The control program may be recorded in a computer-readable recording medium. The function of the processor is implemented by the processor executing the control program. Functions of the demodulation unit 230, the phase shift amount estimation unit 240, and the like are implemented through cooperation between the processor and the storage device.

REFERENCE SIGNS LIST

1 Wireless communication system
100 Transmission device
110, 110A Modulation unit
120 Precoding unit
130 D/A conversion unit
140 Amplification unit
150 Phase shift amount determination unit
160 Signal addition unit
170 PAPR calculation unit
180 Reception quality information acquisition unit
200 Reception device
210 Amplification unit
220 A/D conversion unit
230 Demodulation unit
240 Phase shift amount estimation unit
PAT Phase shift pattern

The invention claimed is:

1. A wireless communication method for performing wireless communication between a transmission device and a reception device, the wireless communication method comprising:

phase shift amount determination processing that determines a random phase shift amount for each of subcarriers of transmission data;

signal addition processing that adds a known signal, which is to be used in the reception device for estimating the random phase shift amount, to the transmission data;

modulation processing that modulates the transmission data and further shifts a phase according to the random phase shift amount for each of the subcarriers;

precoding processing that performs precoding on the transmission data after the modulation processing; and transmission processing that transmits the transmission data after the precoding processing from the transmission device to the reception device, wherein the signal addition processing is performed for each predetermined data unit that a slot, and the signal addition processing adds the known signal to a head or end of the predetermined data unit.

2. The wireless communication method according to claim 1, wherein the phase shift amount determination processing includes:

acquiring a phase shift pattern indicating a random sequence of the phase shift amount; and determining the random phase shift amount for each of the subcarriers by repeatedly applying the random sequence every predetermined number of subcarriers.

3. The wireless communication method according to claim 1, wherein the phase shift amount determination processing includes:

acquiring a plurality of types of phase shift patterns each indicating a random sequence of the phase shift amount;

selecting, from among the plurality of types of phase shift patterns, one that minimizes a peak to average power ratio (PAPR) of the transmission data after the precoding processing or one that maximizes a reception quality of the transmission data in the reception device; and determining the random phase shift amount for each of the subcarriers based on the random sequence indicated by the selected phase shift pattern.

4. The wireless communication method according to claim 1, further comprising:

receiving, by the reception device, the transmission data transmitted from the transmission device as reception data;

estimating, by the reception device, the random phase shift amount based on the known signal; and demodulation processing that demodulates the reception data based on the estimated phase shift amount.

5. A wireless communication system comprising:

a transmission device; and a reception device, wherein the transmission device is configured to execute:

phase shift amount determination processing that determines a random phase shift amount for each of subcarriers of transmission data;

signal addition processing that adds a known signal, which is to be used in the reception device for estimating the random phase shift amount, to the transmission data;

modulation processing that modulates the transmission data and further shifts a phase according to the random phase shift amount for each of the subcarriers;

precoding processing that performs precoding on the transmission data after the modulation processing; and transmission processing that transmits the transmission data after the precoding processing from the transmission device to the reception device, wherein the signal addition processing is performed for each predetermined data unit that a slot, and the signal addition processing adds the known signal to head or end of the predetermined data unit.

6. The wireless communication system according to claim 5, wherein the reception device is configured to:

receive the transmission data transmitted from the transmission device as reception data;

estimate the random phase shift amount based on the known signal; and demodulate the reception data based on the estimated phase shift amount.

7. A transmission device that performs wireless communication with a reception device, the transmission device comprising processing circuitry configured to:

determine a random phase shift amount for each of subcarriers of transmission data;

add a known signal, which is to be used in the reception device for estimating the random phase shift amount, to the transmission data;

modulate the transmission data and further shift a phase according to the random phase shift amount for each of the subcarriers;

perform precoding on the transmission data after modulation; and transmit the transmission data after the precoding to the reception device, wherein the addition of the known signal is performed for each predetermined data unit a slot, and the known signal is added to head or end of the predetermined data unit.

* * * * *